United States Patent
Tsai et al.

(10) Patent No.: US 9,523,826 B2
(45) Date of Patent: Dec. 20, 2016

(54) PLUGGABLE OPTICAL TRANSCEIVER MODULE

(71) Applicant: Applied Optoelectronics, Inc., New Taipei (TW)

(72) Inventors: Chao-Hung Tsai, New Taipei (TW); Chien-Te Lin, New Taipei (TW); Che-Shou Yeh, New Taipei (TW)

(73) Assignee: Applied Optoelectronics, Inc., Sugar Land, TX (US)

( * ) Notice: Subject to any disclaimer, the term of this patent is extended or adjusted under 35 U.S.C. 154(b) by 88 days.

(21) Appl. No.: 14/504,500

(22) Filed: Oct. 2, 2014

(65) Prior Publication Data

US 2015/0093083 A1    Apr. 2, 2015

(30) Foreign Application Priority Data

Oct. 2, 2013   (TW) .............................. 102135723 A

(51) Int. Cl.
*G02B 6/42* (2006.01)

(52) U.S. Cl.
CPC ............. *G02B 6/423* (2013.01); *G02B 6/4246* (2013.01); *G02B 6/4261* (2013.01); *G02B 6/4284* (2013.01); *G02B 6/4292* (2013.01)

(58) Field of Classification Search
None
See application file for complete search history.

(56) References Cited

U.S. PATENT DOCUMENTS

| 7,201,520 B2 * | 4/2007 | Mizue | G02B 6/4292 385/92 |
| 2011/0081114 A1 * | 4/2011 | Togami | G02B 6/4246 385/76 |

\* cited by examiner

*Primary Examiner* — Michelle R Connelly
(74) *Attorney, Agent, or Firm* — Grossman Tucker Perreault & Pfleger, PLLC; Norman S. Kinsella

(57) ABSTRACT

A pluggable optical transceiver module for inserted into plugging slot includes main body and sliding component. The main body has opposite two side surfaces and two sliding slots. The two sliding slots are located at the two side surfaces. The sliding component includes linkage arm and two extending arms. The two extending arms are connected to the linkage arm. Each extending arm has a second fastening part. The main body is between the two extending arms. The two extending arms are disposed on the two sliding slots to have fastening position and releasing position. Two first fastening parts are fastened to the two second fastening parts when the two extending arms are located at fastening position. The two second fastening parts press the two first fastening parts, respectively, for the two first fastening parts being farther from each other when the two extending arms are located at releasing position.

7 Claims, 8 Drawing Sheets ously known the optical transceiver module as well.

PLUGGABLE OPTICAL TRANSCEIVER MODULE

CROSS-REFERENCE TO RELATED APPLICATIONS

This non-provisional application claims priority under 35 U.S.C. §119(a) on Patent Application No(s) 102135723. filed in Taiwan, R.O.C. on Oct. 2, 2013, the entire contents of which are hereby incorporated by reference.

TECHNICAL FIELD

The disclosure relates to an optical communication component, more particularly to a pluggable optical transceiver module.

BACKGROUND

An optical transceiver module is generally installed in an electronic communication facility in the modern high speed communication networks. In order to make the electronic communication facility flexible and easy to repair, the optical transceiver module is inserted into a corresponding socket disposed in the communication facility in a pluggable manner. In general, the socket is disposed on a circuit board. In order to define the electrical-to-mechanical interface of the optical transceiver module and the corresponding socket, different specifications have been provided such as XFP (10 Gigabit Small Form Factor Pluggable) used in 10 GB/s communication rate and QSFP (Quad Small Form-factor Pluggable).

A fastening mechanism is disposed in the socket corresponding to the optical transceiver module so that the optical transceiver module is securely fixed to the socket by the fastening mechanism. Therefore, it is indispensable that the optical transceiver module must have a releasing mechanism. This makes the optical transceiver module slip out from the socket by easily removing the lock.

On the other hand, a common communication facility, such as a hub, usually comprises at least one optical transceiver module for converting optical signals into electronic signals. When the common communication facility is used for a long time, dusts may drop on the surface of common communication facility. Thus, dusts may also drop on the optical transceiver module without any appropriate protection when the optical fiber cable is connected or removed from the optical transceiver module. Consequently, the dusts may damage the optical transceiver module and affect the transmission of the signals.

In view of this, it is important to improve the convenient connection and disconnection between the optical transceiver module and the socket and its dust-proof function.

SUMMARY

The disclosure provides a pluggable optical transceiver module configured to be inserted into a plugging slot. The pluggable optical transceiver module comprises a main body and a sliding component. The main body has two side surfaces opposite to each other and two sliding slots. The two sliding slots are located at the two side surfaces. The main body is configured to be inserted into the plugging slot. The sliding component comprises a linkage arm and two extending arms. The two extending arms are connected to two ends of the linkage arm, respectively. Each extending arm has a second fastening part. The main body is between the two extending arms. The two extending arms are slidably disposed on the two sliding slots to have a fastening position and a releasing position. Two first fastening parts are fastened to the two second fastening parts when the two extending arms are located at the fastening position. The two second fastening parts press the two first fastening parts, respectively, to make the two first fastening parts be farther away from each other when the two extending arms are located at the releasing position.

BRIEF DESCRIPTION OF THE DRAWINGS

The present disclosure will become more fully understood from the detailed description and the drawings given herein below for illustration only, thus does not limit the present disclosure, wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
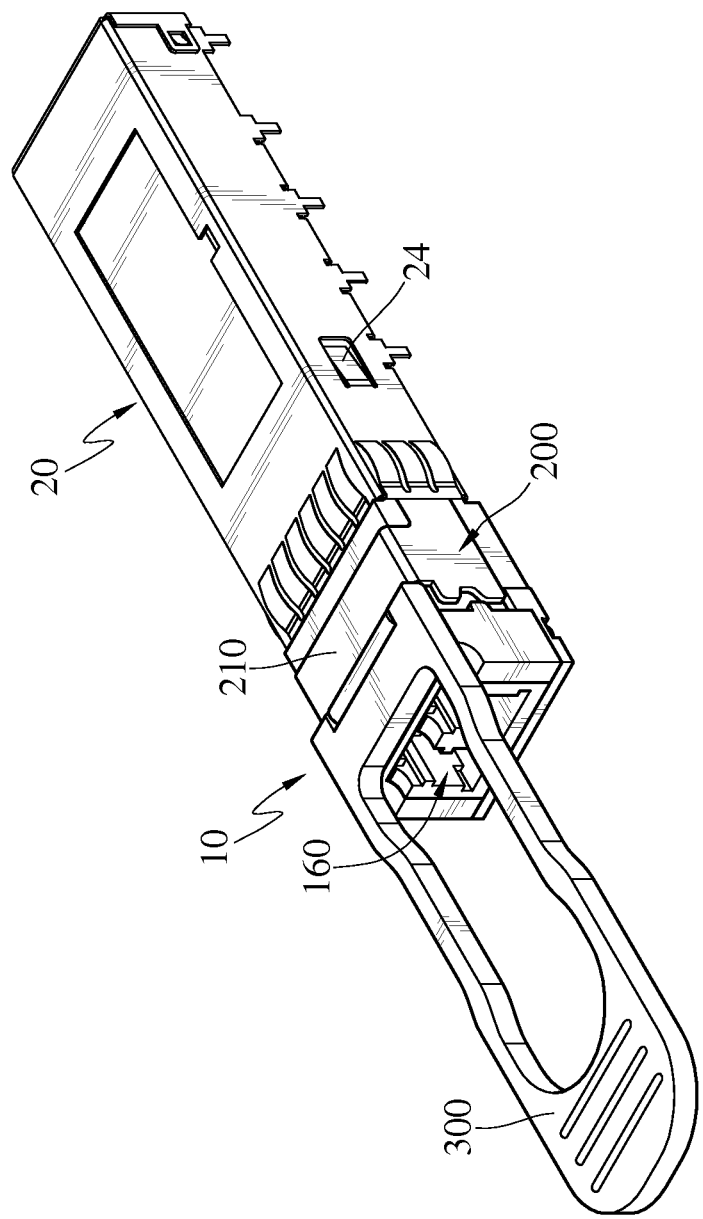
FIG. 1 is a perspective view of a pluggable optical transceiver module according to a first embodiment.
Figure 2:
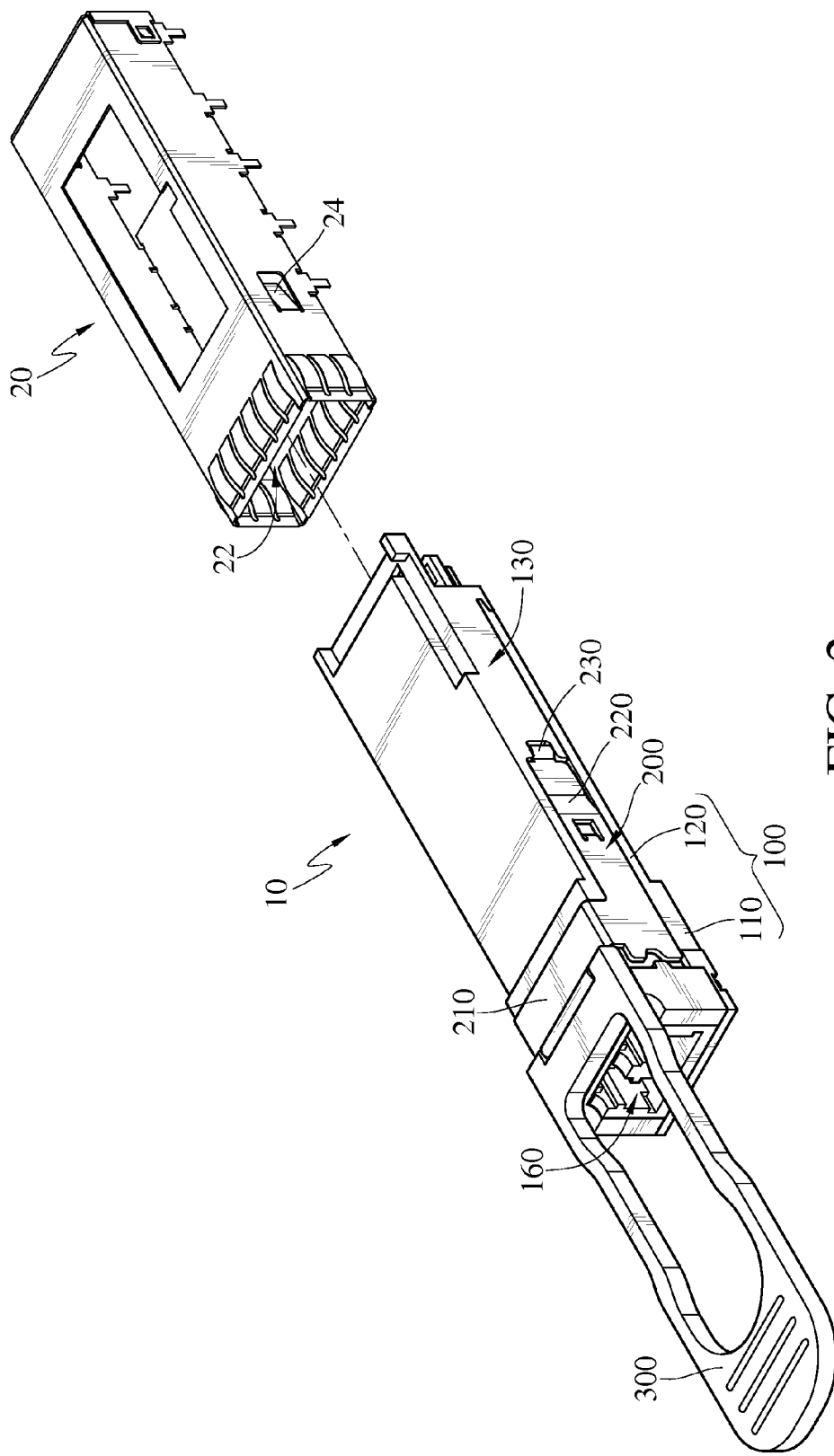
FIG. 2 is an exploded view of the pluggable optical transceiver module in FIG. 1.

FIG. 1 is a perspective view of a pluggable optical transceiver module according to a first embodiment. FIG. 2 is an exploded view of the pluggable optical transceiver module in FIG. 1. In the first embodiment, a pluggable optical transceiver module 10 is configured to be inserted into a socket 20 to convert optical signals into electronic signals. The socket 20 has a plugging slot 22 and two first fastening parts 24. Each first fastening part 24 is elastic. One end of the first fastening part 24 is connected to a case of the socket 20 and the other end of the first fastening part 24 is located in the plugging slot 22. In this embodiment, the first fastening part 24 is an elastic slice.

Figure 3:
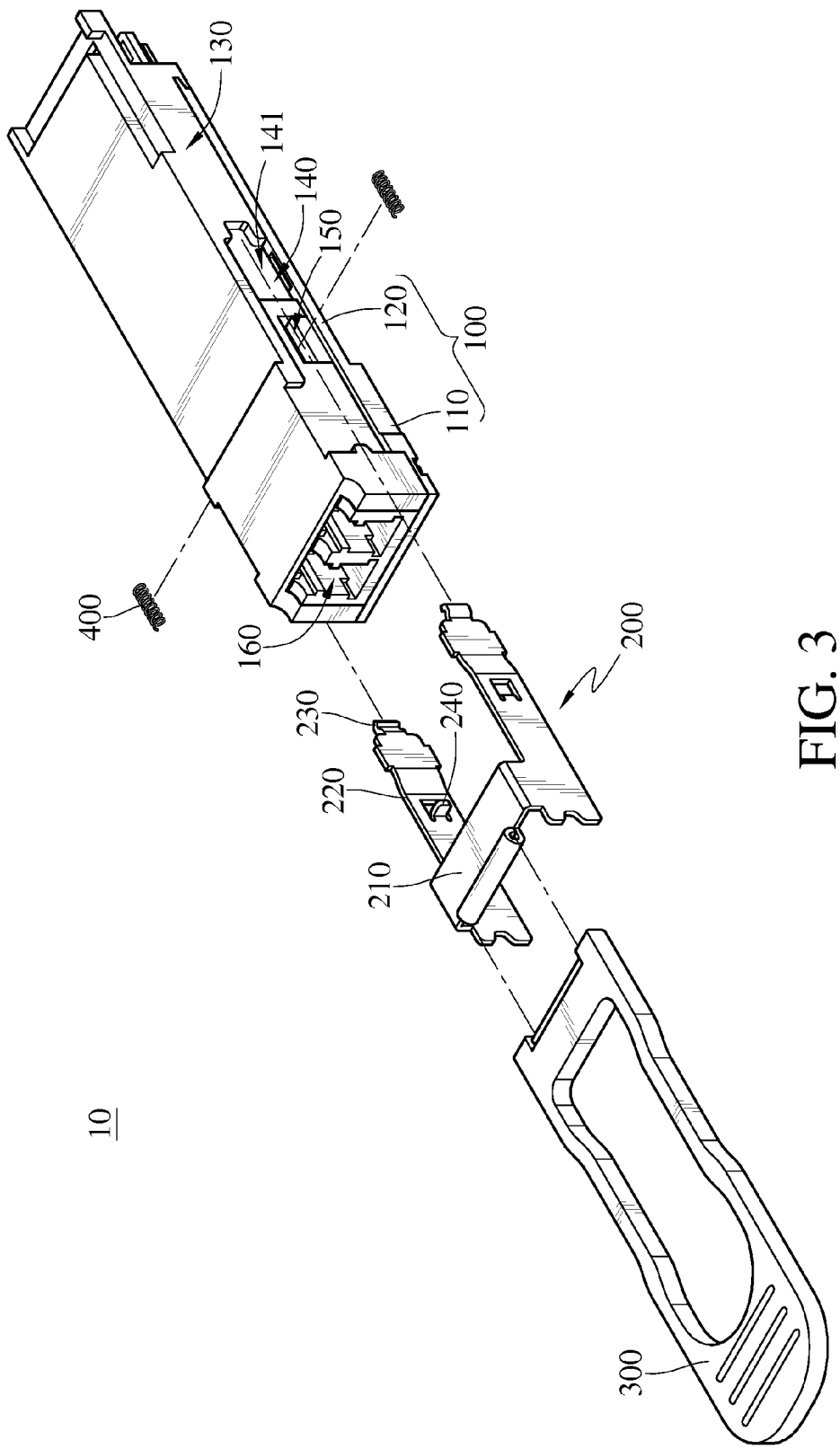
FIG. 3 is another exploded view of the pluggable optical transceiver module in FIG. 1.
Figure 4A:
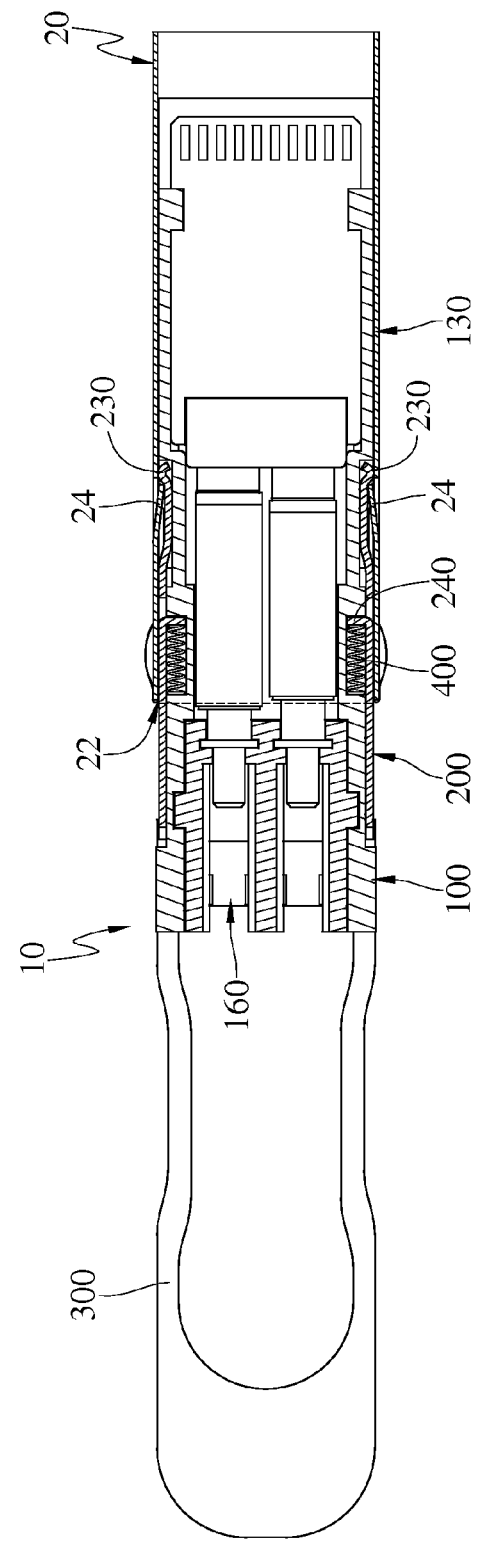
FIG. 4A is a cross-sectional view of the pluggable optical transceiver module in FIG. 1 when a sliding component is located at a fastening position.
Figure 4B:
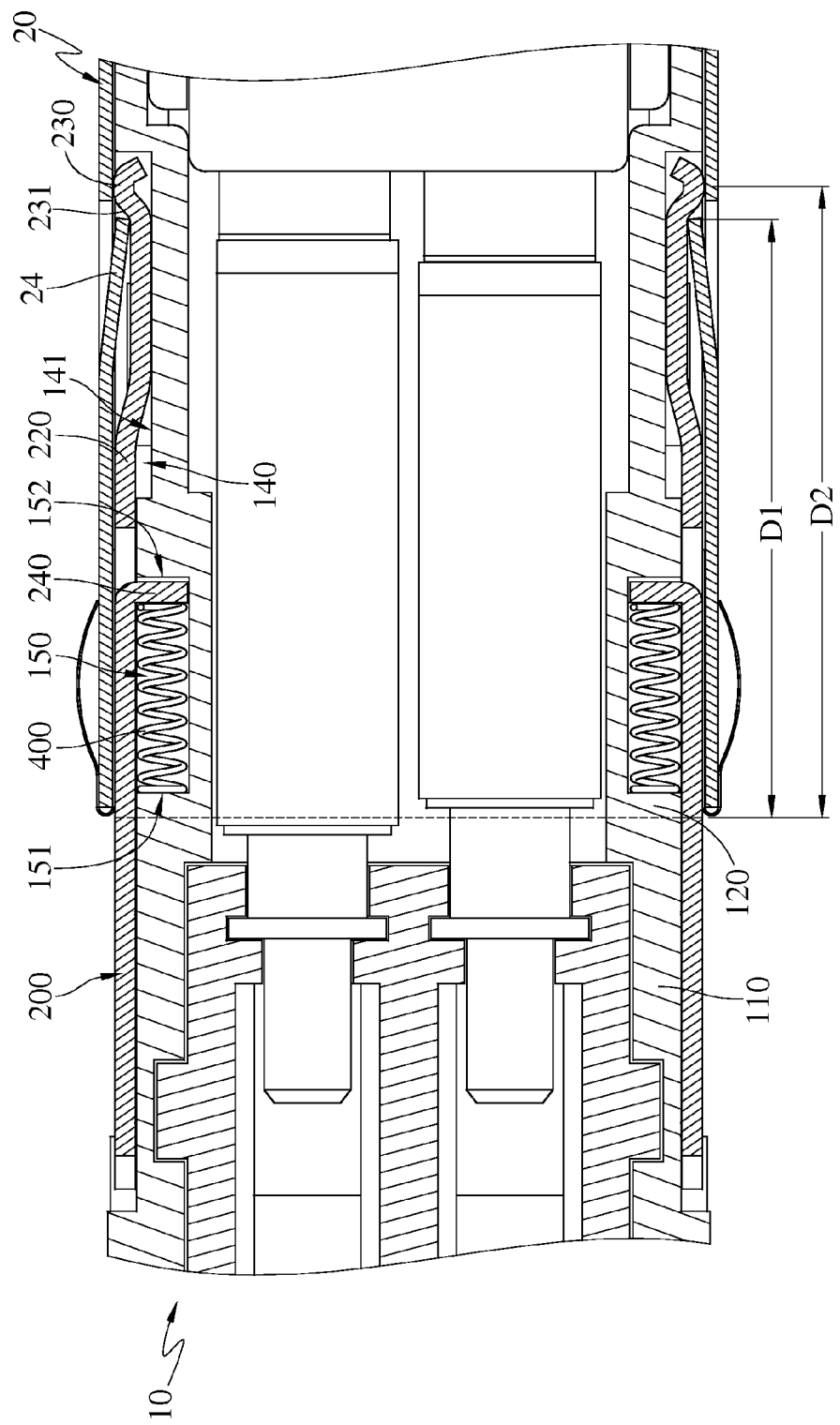
FIG. 4B is a partial enlarged view of the pluggable optical transceiver module in FIG. 4A.

FIG. 3 is another exploded view of FIG. 1. FIG. 4A is a cross-sectional view of FIG. 1 when a sliding component is located at a fastening position. FIG. 4B is a partial enlarged view of FIG. 4A. The pluggable optical transceiver module 10 comprises a main body 100, a sliding component 200, a pull handle 300 and two elastic components 400. The main body 100 comprises a head part 110 and an inserted part 120 that are connected to each other. The inserted part 120 is configured to be inserted into the plugging slot 22 of the socket 20. The main body 100 has two side surfaces 130, two sliding slots 140 and two limiting spaces 150. The two side surfaces 130 are located at opposite two sides of the head part 110 and the inserted part 120, respectively. The two sliding slots 140 are located at the two side surfaces 130, respectively, and extend from the head part 110 to the inserted part 120. Each sliding slot 140 has a bottom surface 141 which is, but not limited to, parallel to the side surface 130. In other embodiments, the slot bottom surface 141 encloses an acute angle with the side surface 130.

The two limiting spaces 150 are located at the bottom surfaces 141 of the two sliding slots 140, respectively. Each limiting space 150 has a first limiting surface 151 and a second limiting surface 152. Both of the first limiting surface 151 and the second limiting surface 152 are connected to the bottom surface 141. The first limiting surface 151 is closer to the head part 110 than the second limiting surface 152.

Moreover, the main body 100 is configured to accommodate a photoelectric conversion circuit (not shown in the figures). Both of the two sliding slots 140 and the two limiting spaces 150 do not penetrate through the inner surface of the main body 100. Therefore, the main body 100 protects the photoelectric conversion circuit from being contaminated by atmospheric dust.

The head part 110 has at least one optical fiber terminal 160. An optical fiber plug may plug into the photoelectric conversion circuit in the main body 100 through the optical fiber terminal 160.

The sliding component 200 comprises a linkage arm 210 and two extending arms 220. The two extending arms 220 are connected to two ends of the linkage arm 210, respectively. The main body 100 is between the two extending arms 220. The two extending arms 220 are slidably disposed on the two sliding slots 140, respectively. Each extending arm 220 has a second fastening part 230 and a limited part 240. The second fastening part 230 extends along a direction far away from the side surface 130. Each second fastening part 230 has a fastening surface 231 located at one side of the second fastening part 230 facing the head part 110. A distance D1 between one side of the fastening surface 231 which is close to the side surface 130 and the head part 110 is less than a distance D2 from another side of the fastening surface 231 which is far away from the side surface 130 from and the head part 110. That is, the fastening surface 231 is an inclined surface enclosing an acute angle with the side surface 130. The limited part 240 extends toward the side surface 130 and is located in the limiting space 150. The limited part 240 is able to slide between the first limiting surface 151 and the second limiting surface 152 relative to the main body 100. The sliding component is able to slide relative to the main body 100 to have a fastening position and a releasing position. The two first fastening parts 230 are farther from the head part 110 when the two extending arms 220 are located at the fastening position. The two first fastening parts 230 are closer to the head part 110 when the two extending arms 220 are located at the releasing position.

The pull handle 300 is pivoted on the linkage arm 210 of the sliding component 200 and extends outside from the main body 100. The pull handle 300 is able to pivot about the sliding component 200 to be in front of the head part 110 or on the top of the head part 110. In this embodiment, the pull handle 300 is configured to slide the sliding component 200 but the disclosure is not limited thereto. In other embodiments, the pluggable optical transceiver module 10 does not comprise the pull handle 300 and is able to be unplugged from the socket 20 by unplugging the linkage arm 210 directly. Furthermore, in this embodiment, the pull handle 300 is pivoted on the linkage arm 210 but the disclosure is not limited thereto. In other embodiments, the pull handle 300 is welded to the linkage arm 210 or screwed to the linkage arm 210.

Moreover, the pull handle 300 is a band extending outside from the main body 100 in other embodiments. In detail, the band is made of soft rubber materials and rigid materials, which makes the band be highly tough and highly strengthened so that the band is difficult to be ruptured. Meanwhile, because the end of the band is soft rubber, the band has greater deformation so that the band may be temporarily deformed to be in accordance with the operation of the users.

Two elastic components 400 are located at the two limiting spaces 150, respectively. Each elastic component 400 is sandwiched between the first limiting surface 151 disposed on the limiting space 150 and the limited part 240 of the extending arm 220. The elastic component 400 normally presses the limited part 240 so that the second fastening part 230 is located at the fastening position. In this embodiment, both of the number of the limiting spaces 150 and that of the elastic components 400 are, for example, two. In other embodiments, both of the number of the limiting space 150 and that of the elastic component 400 are one.

Figure 5A:
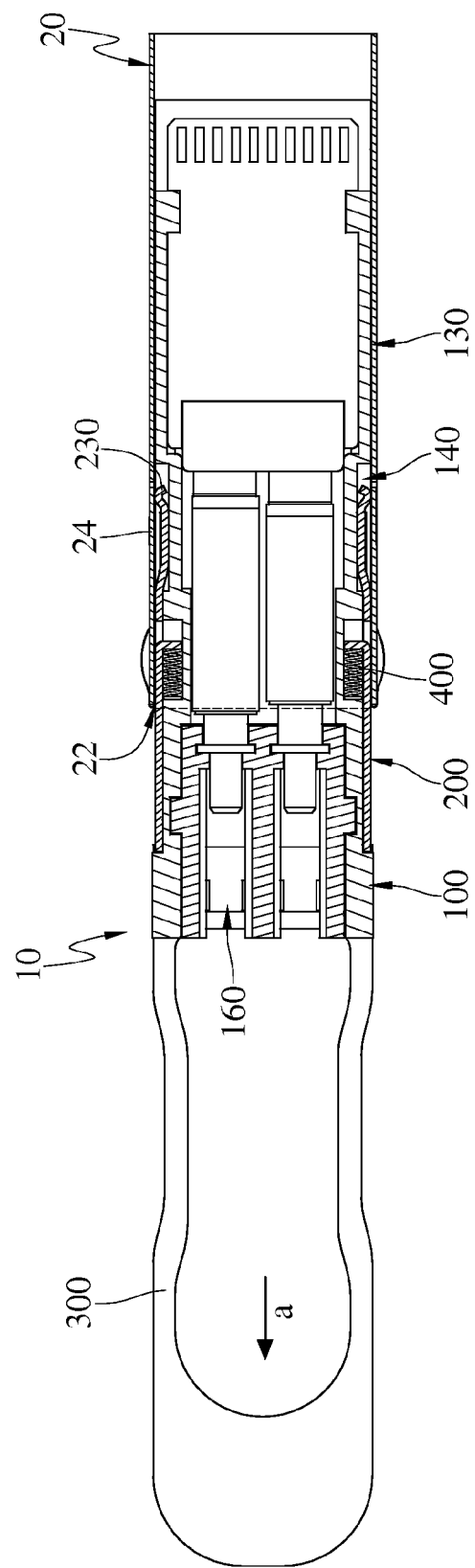
FIG. 5A is a cross-sectional view of the pluggable optical transceiver module in FIG. 1 when the sliding component is located at a releasing position.
Figure 5B:
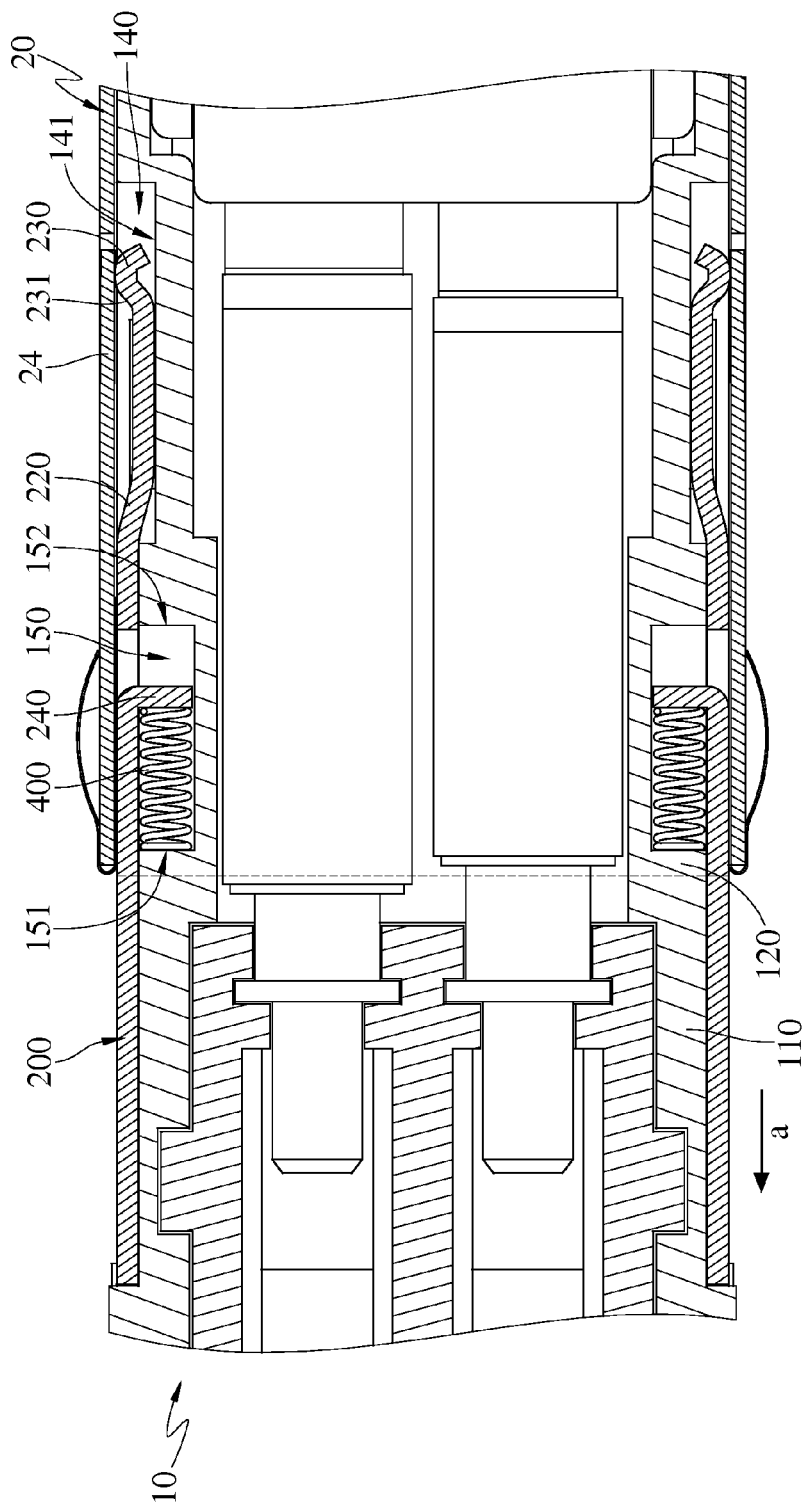
FIG. 5B is a partial enlarged view of the pluggable optical transceiver module in FIG. 5A.

FIG. 4A is a cross-sectional view of the pluggable optical transceiver module in FIG. 1 when a sliding component is located at a fastening position. FIG. 4B is a partial enlarged view of the pluggable optical transceiver module in FIG. 4A. FIG. 5A is a cross-sectional view of the pluggable optical transceiver module in FIG. 1 when the sliding component is located at a releasing position. FIG. 5B is a partial enlarged view of the pluggable optical transceiver module in FIG. 5A. As seen in FIG. 4A and FIG. 4B, the pluggable optical transceiver module 10 is inserted into the plugging slot 22 of the socket 20. The two first fastening parts 24 are fastened to the two second fastening parts 230 when the two elastic components 400 respectively press the two limited parts 240 to locate the two second fastening parts 230 at the fastening position. Therefore, the pluggable optical transceiver module 10 is stably inserted into the plugging lot 22 and electrically connected to the socket 20.

As seen in FIG. 5A and FIG. 5B, users is able to pull the pull handle 300 along the direction indicated by an arrow a when removing the pluggable optical transceiver module 10 from the socket 20. The sliding component 200 is slid by the pull handle 300 relative to the main body 200 to be located at the releasing position. Since the fastening surface 231 is an inclined surface, the two first fastening parts 24 pressed by the fastening surface 231 are far away from each other when the sliding component 200 slides along the direction indicated by the arrow a. That is, the two second fastening parts 230 open the two first fastening parts 24 to release the two first fastening parts 24 from the two second fastening parts 230. Therefore, it is more convenient to plug the pluggable optical transceiver module 10 into the socket 20 and unplug the pluggable optical transceiver module 10 from the socket 20.

Figure 6:
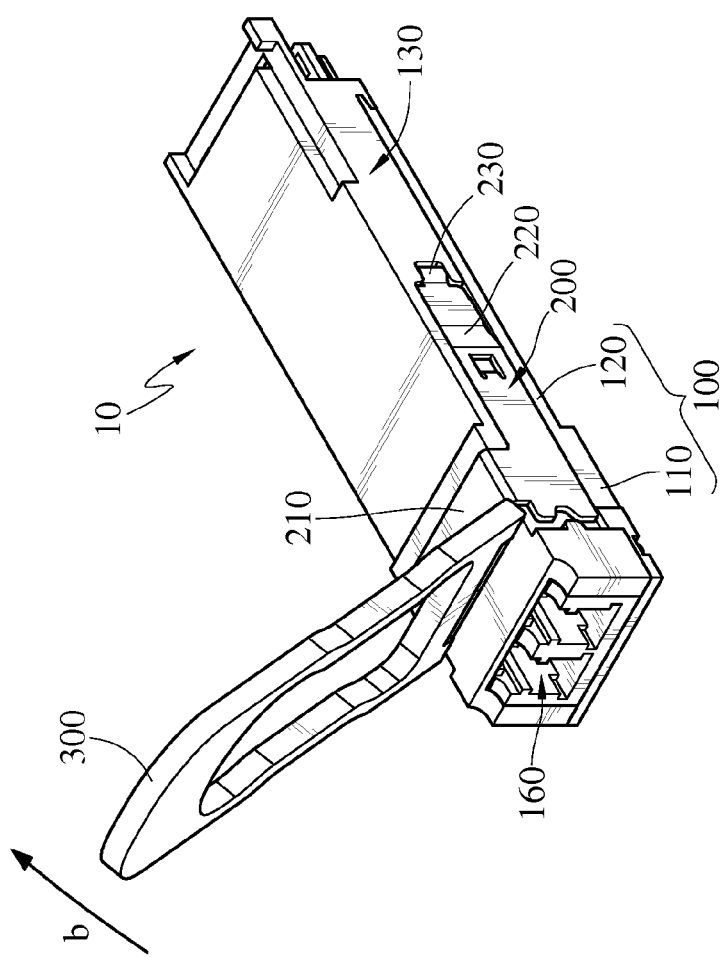
FIG. 6 is a perspective view of the pluggable optical transceiver module in FIG. 2 when a pull handle pivots on a main body.

FIG. 6 is a perspective view of the pluggable optical transceiver module in FIG. 2 when a pull handle pivots on the top of the main body 200. Users are able to apply a force to pull out the pluggable optical transceiver module 10 when the pull handle 300 is located in front of the head part 110. The pull handle 300 is pivoted about the sliding component 200 along the direction indicated by an arrow b to be located above the head part 110 when users insert an optical fiber plug (not shown in the figure) into the optical fiber terminal 160. Since the pull handle 300 does not interfere with the optical fiber plug, it is more convenient for the users to insert the optical fiber plug into the optical fiber terminal 160.

According to the pluggable optical transceiver module of the disclosure, by sliding the sliding component within the two sliding slots, a user is able to easily fasten or release the combination of the two first fastening parts and the two second fastening parts.

Moreover, the pull handle is pivoted about the sliding component so that the pull handle is located in front of the main body or on the top of the main body. Users are able to pull out the pluggable optical transceiver module when the pull handle is located in front of the main body. The pull handle does not interfere with the optical fiber plug when located on the main body. Therefore, it is more convenient for users to insert the optical fiber plug into the optical fiber terminal.

What is claimed is:

1. A pluggable optical transceiver module, for being inserted into a plugging slot of a socket, the socket comprising two first fastening parts located in the plugging slot, the pluggable optical transceiver module comprising:
    a main body having two side surfaces that are opposite to each other and two sliding slots located at the two side surfaces, respectively, wherein the main body is configured to be inserted into the plugging slot, wherein the main body has at least one limiting space and two bottom surfaces forming the two sliding slots, respectively, the two bottom surfaces are parallel to the two side surfaces, the at least one limiting space is located at one of the two side surfaces;
    a sliding component comprising a linkage arm and two extending arms, wherein the two extending arms are connected to two ends of the linkage arm, respectively, each extending arm has a second fastening part, the main body is between the two extending arms, the two extending arms are slidably disposed on the two sliding slots to have a fastening position and a releasing position, the two first fastening parts are fastened to the two second fastening parts when the two extending arms are located at the fastening position, and the two second fastening parts press the two first fastening parts, respectively, to make the two first fastening parts be farther away from each other when the two extending arms are located at the releasing position, wherein each extending arm has a limited part configured to move in the at least one limiting space; and
    an elastic component, wherein the main body has a first limiting surface and a second limiting surface forming the limiting space, the first limiting surface is closer to the head part than the second limiting surface, and the elastic component is located in the limiting space and between the first limiting surface and the limited part and is covered by the extending arm such that the elastic component is confined by the main body and the sliding component.

2. The pluggable optical transceiver module according to claim 1, wherein the main body comprises a head part and an inserted part connected to each other, the inserted part is configured to be inserted into the socket, the two side surfaces are located at two sides of the head part and the inserted part opposite to each other, respectively, wherein both the two sliding slots extend from the head part towards the inserted part, and the two extending arms are able to slide relative to the two sliding slots to have the fastening position which is farther away from the head part and the releasing position which is closer to the head part.

3. The pluggable optical transceiver module according to claim 2, wherein each second fastening part has a fastening surface, and a distance between one side of the fastening surface which is close to the side surface and the head part is less than a distance between another side of the fastening surface which is far away from the side surface and the head part.

4. The pluggable optical transceiver module according to claim 2, wherein the head part has at least one optical fiber terminal.

5. The pluggable optical transceiver module according to claim 1, further comprising two elastic components, wherein the number of the at least one limiting surface is two, the main body has two first limiting surfaces and two second limiting surfaces forming the two limiting spaces together, respectively, the two first limiting surfaces are closer to the head part than the two second limiting surfaces, the two elastic components are located in the two limiting spaces, respectively, and each elastic component is between the first limiting surface and the limited part.

6. The pluggable optical transceiver module according to claim 1, wherein the pluggable optical transceiver module further comprises a pull handle pivoted on the linkage arm of the sliding component.

7. A pluggable optical transceiver module, comprising:
    a main body having a head part and an inserted part that are connected to each other, wherein the main body further comprises opposite two side surfaces and two sliding slots which are located at two sides of the head part and the inserted part opposite to each other, respectively, the two sliding slots are located at the two side surfaces, and the two sliding slots extend from the head part to the inserted part, respectively, wherein the main body has at least one limiting space and two bottom surfaces forming the two sliding slots, respectively, the two bottom surfaces are parallel to the two side surfaces, the at least one limiting space is located at one of the two side surfaces;
    a sliding component comprising a linkage arm and two extending arms, wherein the linkage arm is connected between the two extending arms, each extending arm has a second fastening part, the main body is between the two extending arms, the two extending arms are able to slide relative to the two sliding slots to have a fastening position which is farther away from the head part and a releasing position which is closer to the head part, wherein each extending arm has a limited part configured to move in the at least one limiting space; and
    an elastic component, wherein the main body has a first limiting surface and a second limiting surface forming the limiting space, the first limiting surface is closer to the head part than the second limiting surface, and the elastic component is located in the limiting space and between the first limiting surface and the limited part and is covered by the extending arm such that the elastic component is confined by the main body and the sliding component.

\* \* \* \* \*